March 2, 1926.
R. G. GRODE
BEAD NECKLACE TIP
Filed June 20, 1925
1,575,161
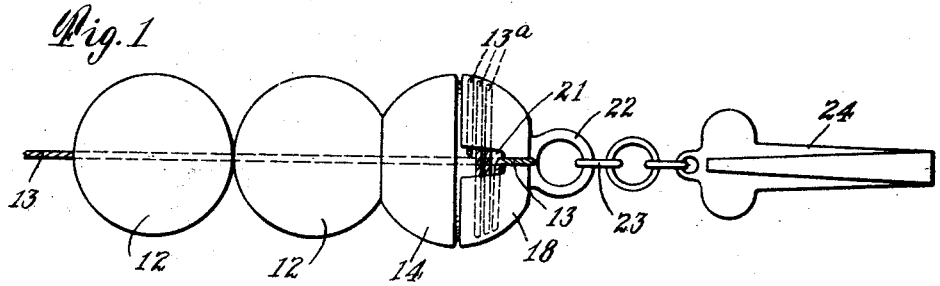
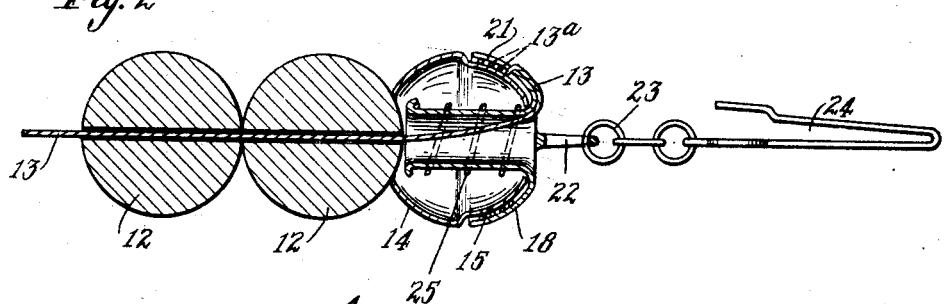
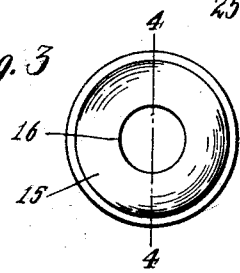
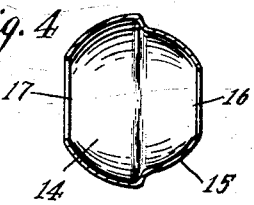
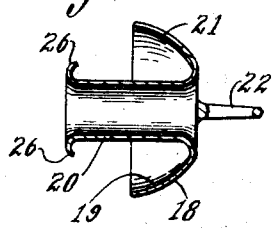
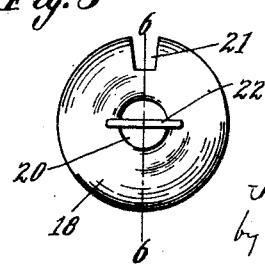
Inventor:
Rudolph G. Grode,
by Wright Brown Quinby May
Att'ys.

Patented Mar. 2, 1926.

1,575,161

UNITED STATES PATENT OFFICE.

RUDOLPH G. GRODE, OF NORWOOD, RHODE ISLAND.

BEAD-NECKLACE TIP.

Application filed June 20, 1925. Serial No. 28,444.

*To all whom it may concern:*

Be it known that I, RUDOLPH G. GRODE, a citizen of the United States, residing at Norwood, in the county of Kent and State of Rhode Island, have invented new and useful Improvements in Bead-Necklace Tips, of which the following is a specification.

The object of this invention is to provide as a terminal member of a bead necklace, a clamping tip simulating a bead and adapted to securely confine, and at the same time conceal, a terminal portion of a cord connecting the beads.

I attain this and other related objects by the improved construction hereinafter described and claimed.

Of the accompanying drawings forming a part of this specification,—

Figure 1 is a side view, on an enlarged scale, of a portion of a bead necklace including my improved tip.

Figure 2 is a section on line 2—2 of Figure 1.

Figure 3 is an end view of the body member of the tip.

Figure 4 is a section on line 4—4 of Figure 3.

Figure 5 is an end view of the head member of the tip.

Figure 6 is a section on line 6—6 of Figure 5.

The same reference characters indicate the same parts in all of the figures.

In the drawings, 12, 12 designate some of the beads of a necklace, and 13 the cord connecting the beads.

The tip in which my invention is embodied is preferably substantially spherical and constitutes an end member of the necklace, its construction being as next described. 14 designates a hollow body member, preferably a ball, having an external clamping face 15, and coaxial outer and inner orifices 16 and 17. The margin of the inner orifice 17 constitutes a seat for the adjacent bead 12. 18 designates a head having an internal clamping face 19, conforming to the external face 15, a tubular shank 20, inserted in the outer orifice 16, a slot 21 opening on the outer margin of the head, and an outwardly projecting coupling eye 22, engaging a link of a short chain 23, which connects a clasp member 24 with the tip.

25 designates a helical expansion spring, seated on the internal surface of the head and on an abutment 26, on the shank 20. The spring normally presses the head member toward the external clamping face of the body member.

A terminal portion of the cord 13 is passed through the shank 20 and across the portion of the head member between the shank and the slot 21. The free portion of the cord is then manipulated to dispose the same in a series of convolutions 13ª between the clamping faces of the body and head members, as indicated by Figures 1 and 2. The interposition of the cord between said faces forces the head member slightly outward and somewhat increases the tension of the spring 25. The convolutions 13ª are therefore securely clamped and concealed between the clamping faces. The surplus end of the cord may be cut off, so that it does not project from the head.

The body member preferably includes a larger inner zone and a smaller outer zone forming the clamping face 15. The head member is preferably concavo-convex, its convex side forming a continuation of the larger zone of the head, so that the body and head members collectively form a substantially spherical tip, resembling a bead 12 in form and size.

I claim:

1. A bead necklace tip comprising a hollow body member having an external clamping face and coaxial outer and inner orifices, the margin of the inner orifice constituting a bead seat; a head member having an internal clamping face conforming to the external clamping face, a tubular shank inserted in the outer orifice of the body member, a slot opening on the outer margin of the head, and an outwardly projecting coupling eye; and an expansion spring seated on the internal surface of the body member and on an abutment on the tubular shank, and normally pressing the head member toward the clamping face of the body member, the arrangement being such that a terminal portion of a necklace cord extending through a string of beads, may be passed through the tubular shank, across a portion of the outer surface of the head member and into the slot, and disposed in convolutions between the clamping faces of the head and body members, said convolutions being confined by the clamping faces.

2. A bead necklace tip as specified by claim 1, the body member being a ball having larger and smaller zones, the smaller zone constituting the external clamping face, the head member having a convex-external surface, forming a continuation of the larger zone of the body member, so that the said members collectively form a substantially spherical tip.

In testimony whereof I have affixed my signature.

RUDOLPH G. GRODE.